United States Patent
Lemineur

(10) Patent No.: US 11,359,956 B2
(45) Date of Patent: Jun. 14, 2022

(54) METHOD FOR EVALUATING THE DYNAMIC LOAD SUPPORTED BY A TIRE BY MEASURING PRESSURE AND LONGITUDINAL ACCELERATION

(71) Applicant: COMPAGNIE GENERALE DES ETABLISSEMENTS MICHELIN, Clermont-Ferrand (FR)

(72) Inventor: Vincent Lemineur, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 705 days.

(21) Appl. No.: 16/338,090

(22) PCT Filed: Sep. 21, 2017

(86) PCT No.: PCT/FR2017/052526
§ 371 (c)(1),
(2) Date: Mar. 29, 2019

(87) PCT Pub. No.: WO2018/060569
PCT Pub. Date: Apr. 5, 2018

(65) Prior Publication Data
US 2020/0025605 A1 Jan. 23, 2020

(30) Foreign Application Priority Data
Sep. 29, 2016 (FR) ...................... 1659295

(51) Int. Cl.
*G01G 19/08* (2006.01)
*B60C 23/04* (2006.01)
*G01G 19/10* (2006.01)

(52) U.S. Cl.
CPC ....... *G01G 19/086* (2013.01); *B60C 23/0408* (2013.01); *B60C 23/0488* (2013.01); *G01G 19/10* (2013.01)

(58) Field of Classification Search
CPC ...... G01G 19/086; G01G 19/10; G01G 19/08; G01G 19/025; B60C 23/0408; B60C 23/0488; B60C 23/064; B60W 40/13
(Continued)

(56) References Cited

U.S. PATENT DOCUMENTS 5,182,712 A * 1/1993 Kyrtsos ................. G01G 19/10
701/1
5,817,989 A * 10/1998 Shimizu ................ G01G 19/08
177/136
(Continued)

FOREIGN PATENT DOCUMENTS

DE         103 58 335 B3    5/2005
DE   10 2011 004 028 B3    8/2012
(Continued)

OTHER PUBLICATIONS

International Search Report dated Nov. 29, 2017, in corresponding PCT/FR2017/052526 (6 pages).

*Primary Examiner* — Eric Blount
(74) *Attorney, Agent, or Firm* — Venable LLP

(57) ABSTRACT

A method, for evaluating the variation in the dynamic load borne by a tire comprising a front axle and a rear axle, comprises steps during which: the pressure of the air contained inside the tire is measured, a difference in load borne by the tire is determined as a function of the transfer of the total load of the vehicle between axles and of the position of the tire on the vehicle and, using a tire model that is preestablished, a pressure differential is determined, a corrected pressure value is determined, on the basis of the corrected pressure values, a reference pressure is deter-
(Continued)

mined, and the difference between the measured pressure in the reference pressure is calculated, and the variation in dynamic load borne by the tire is determined on the basis of the model of the tire.

15 Claims, 4 Drawing Sheets

(58) Field of Classification Search
USPC .......................... 73/146; 340/442–447, 440; 702/174–175; 152/151
See application file for complete search history.

(56) References Cited

U.S. PATENT DOCUMENTS

| | | |
|---|---|---|
| 7,340,368 B2 | 3/2008 | Fiedler et al. |
| 7,856,870 B2 * | 12/2010 | Nakao .................... B60C 23/061 |
| | | 73/146 |
| 8,887,561 B2 | 11/2014 | Lemineur |
| 9,222,854 B2 | 12/2015 | Singh et al. |
| 9,310,242 B2 | 4/2016 | Kammann et al. |
| 9,752,962 B2 * | 9/2017 | Singh ...................... B60T 8/172 |
| 9,975,391 B2 * | 5/2018 | Tseng .................. B60G 17/0162 |
| 2007/0078593 A1 | 4/2007 | Fiedler et al. |
| 2007/0204685 A1 * | 9/2007 | Corniot ................... B60C 23/04 |
| | | 73/146 |
| 2007/0296173 A1 | 12/2007 | Regnell et al. |
| 2013/0125639 A1 | 5/2013 | Lemineur |
| 2014/0008132 A1 | 1/2014 | Kamamann et al. |
| 2014/0257629 A1 * | 9/2014 | Singh .................... B60T 8/1725 |
| | | 701/34.4 |
| 2014/0278040 A1 | 9/2014 | Singh et al. |

FOREIGN PATENT DOCUMENTS

| | | |
|---|---|---|
| EP | 2593317 B1 | 5/2013 |
| EP | 2 778 631 A2 | 9/2014 |
| EP | 3 006 234 A1 | 4/2016 |
| WO | 2006/043872 A1 | 4/2006 |
| WO | 2012/007296 A1 | 1/2012 |

* cited by examiner

METHOD FOR EVALUATING THE DYNAMIC LOAD SUPPORTED BY A TIRE BY MEASURING PRESSURE AND LONGITUDINAL ACCELERATION

BACKGROUND

The invention is an improvement to the method described in publication EP 2 593 317 regarding a method for estimating the dynamic load borne by a tyre mounted on a vehicle in motion. This method also makes it possible to evaluate the near-static load borne by the said tyre.

The method described in the above-mentioned publication, although not limited to such applications, is more particularly concerned with tyres of civil engineering plant of the dumper type, intended to carry heavy loads over routes that are often uneven, for example in quarries or in mines.

This method makes it possible fairly accurately to evaluate the dynamic load borne by a tyre on the basis of a pressure measurement alone, over a given period that alternates intervals of running empty and of running laden. Because the load-bearing capacity of a vehicle of civil engineering type is usually connected to that of the tyres, there is therefore a particular benefit to be had by knowing, in real-time, the stress loadings on these tyres in order, if necessary, to adapt the vehicle operating conditions or the paths taken by these vehicles.

The variations in pressure within the tyre are generated, on the one hand, by variations in the load carried, which is made up of the weight of the unladen vehicle, and of its commercial load, also referred to as payload, and of the dynamic load resulting from instantaneous variations associated with the dynamic response of the vehicle to the running conditions and, on the other hand, by the variation in the temperature of the inflation air which is associated with the heating-up of the materials of which the tyre is made, and of that of the rim, as a result of the proximity of the braking devices.

The method stems from the observation that the pressure variations associated with the temperature of the internal air evolve slowly and vary at frequencies that are very low and very much below 1 Hz, because of the high thermal inertia of the tyre, whereas the variations in dynamic pressure are associated with variations at much higher frequencies of the order of 1 or 2 Hz, or even higher.

The method described in publication EP 2 593 317 relies on determining a reference pressure, which is the pressure that the tyre would have under the same temperature and load conditions with the vehicle stationary on flat ground. The slow variations in this reference pressure reflect variations in the temperature of the internal air. The variation in load, or dynamic load, can then be calculated from the difference between the measured pressure and the reference pressure and from a model of the tyre established beforehand and connecting a variation in load with a variation in pressure without the need to measure the temperature of the air contained inside the tyre.

However, this model suffers from difficulties in implementing it, insofar as the running periods comprise ascent and descent, acceleration, braking and cornering portions which are liable to modify the evaluation of the reference pressure.

Such is the case with the transfers of load between the front and rear axles which occur during the ascent or descent phases which in certain open-cast mines may be particularly lengthy. These load transfers, which lead to an increase or decrease in the pressure in the tyre are erroneously confused with pressure variations associated with temperature, and corrupt the reference pressure calculation.

SUMMARY

It is an object of the invention to afford a corrective solution to the above-mentioned problem.

According to the invention, the method for evaluating the variation in the dynamic load borne by a tyre of a vehicle comprising a front axle and a rear axle anticipates executing, during a running period, steps during which:

step a: the pressure of the air contained inside the tyre is measured, step b: at each pressure measurement point, a difference in load borne by the said tyre is determined as a function of the transfer of the total load of the vehicle between axles and of the position of the said tyre on the vehicle and, using a tyre model that is preestablished and connects a difference in load with a difference in pressure, a pressure differential associated with the difference in load borne by the tyre is determined, step c: a corrected pressure value is determined by calculating the algebraic sum of the value of the measured pressure and the value of the said pressure differential, step d: on the basis of the corrected pressure values, a reference pressure corresponding to the pressure of the same tyre subjected to the same temperature conditions, and at a determined static reference load, is determined, step e: the difference between the measured pressure in the reference pressure is calculated, and the variation in dynamic load borne by the tyre is determined on the basis of the said model of the tyre.

The pressure used as a basis for evaluating the reference pressure is a pressure corrected for the pressure differential induced by the transfer of load between axles, and corresponds to the pressure that this same tyre would have if it were running under the same load and temperature conditions on flat ground. The value of the pressure differential is therefore zero when the vehicle is running on flat ground at constant speed.

Steps c, d and e are similar to those described in document EP 2 593 317.

The method according to the invention may also comprise the following features, on their own or in combination:

The value of the transfer, between axles, of the total load borne by the vehicle is estimated on the basis of a predetermined law connecting the value of the said total load borne by the vehicle, the height of the centre of gravity of the vehicle, the value of the wheelbase separating the front axle and the rear axle, and the value of the longitudinal acceleration.

The value of the longitudinal acceleration is estimated by connecting the vehicle position data obtained from a GPS system with the known profile of the route taken by the vehicle, or by calculating the gradient by taking into consideration the variations in altitude as measured by the said GPS system.

The value of the longitudinal acceleration is estimated using an accelerometer mounted on the vehicle.

The predetermined law is of the type:

$$\Delta F_Z = \frac{h}{E} * \frac{(F_{ZAV} + F_{ZAR})}{g} * \gamma_l$$

The definition of the reference pressure is obtained by determining a polynomial curve fitted to the corrected pressure values.

The running period comprises at least, successively, a cycle of running unladen, and a cycle of running laden, these respectively delimiting an unladen-running time interval and a laden-running time interval.

At the end of step a and prior to the start of step b, time intervals corresponding to laden and unladen running cycles, during which the total load of the vehicle remains constant, are identified.

During step f, a payload borne by the tyre during a time interval corresponding to a laden-running cycle is evaluated using the said model of the tyre and using a difference in pressure between an unladen reference pressure and a laden reference pressure.

The values of the unladen reference pressure for a time interval corresponding to a laden-running cycle are determined by interpolating or by extrapolating the reference pressure values obtained during the unladen-running cycles prior and subsequent to the said laden-running cycle.

The unladen reference pressure values for a time interval corresponding to a laden-running cycle are determined by adjusting, by translation, the pressure values obtained using the best-fit polynomial curve determined during the time interval corresponding to this laden-running cycle, so that the reference pressure values at the start and at the end of this time interval more or less align with, respectively, the reference pressure values obtained at the end of the time interval corresponding to the previous unladen-running cycle, and the reference pressure values obtained at the start of the time interval corresponding to the next unladen-running cycle.

During a step g, the value of the total laden weight of the vehicle is calculated by calculating the sum of the payloads borne by each of the tyres and the total unladen weight of the said vehicle, and a new evaluation of the height h of the centre of gravity G is determined.

Steps b, c, d, e, f and g are carried out as many times as necessary using, for the value of the total laden weight of the vehicle, the value obtained in step f, and using, for the height of the centre of gravity, the value obtained in step g, until the value of the total laden weight and the value of the height of the centre of gravity converge towards stable values.

The invention also relates to a device for implementing the method according to one of the abovementioned features, comprising:
at least one computer processing unit
data interchange means for exchanging data between the computer processing unit and sensors capable of acquiring values for pressure and for longitudinal acceleration
coded instructions loaded into the computer processing unit to make it possible to execute the steps of the method.

The invention finally relates to the software containing the programmed code elements for implementing the method, when the said software is loaded into a computer processing unit and executed by the said computer processing unit, or when the said software is recorded onto a support that can be read on a computer processing unit.

BRIEF DESCRIPTION OF THE FIGURES

The invention will be understood better from studying the appended figures, which are provided by way of example and are in no way limiting, and in which.

DETAILED DESCRIPTION

Figure 1:
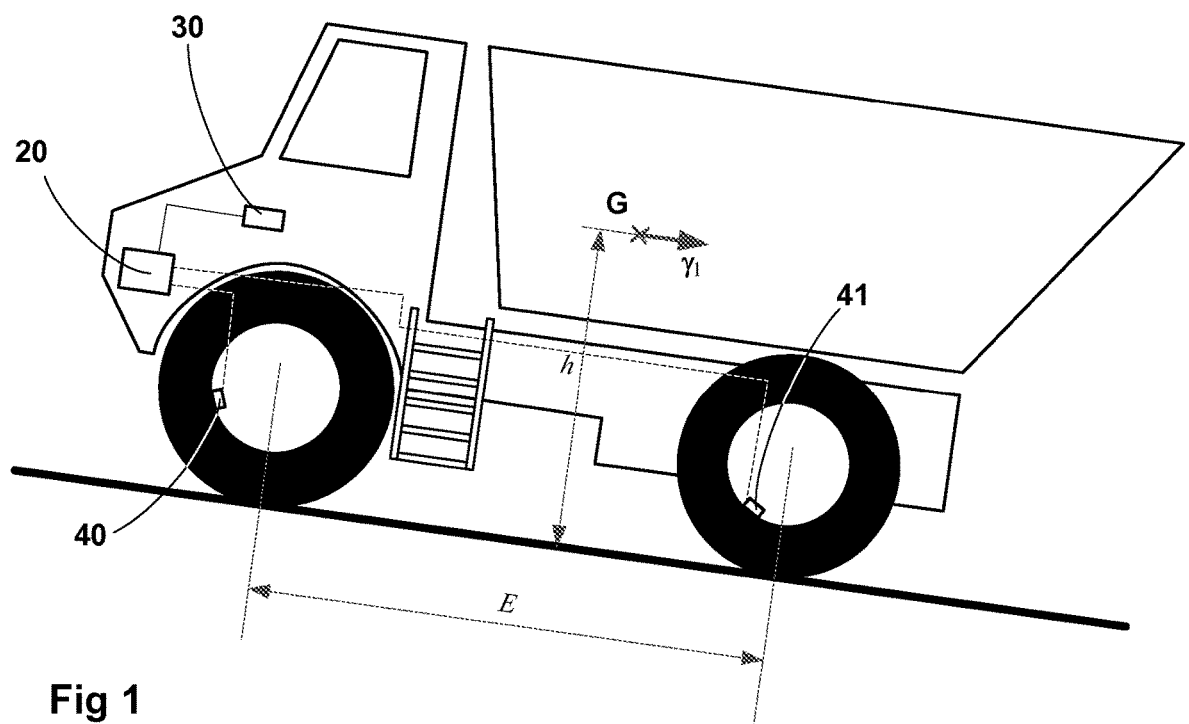
FIG. 1 schematically illustrates a civil engineering vehicle moving over inclined ground.

The civil engineering vehicle illustrated in FIG. 1 is of the "dumper" type used for transporting heavy loads over made-up routes. These vehicles are used in particular in open-cast mines comprising a track which for example allows the vehicle to descend empty and re-ascend laden with the ore extracted from the cutting face and that makes up the payload. In order to improve the efficiency of the mining operations, the vehicles are being made to transport increasingly heavy loads. The total static load $F_{ZTot}$ transported, which comprises the unladen mass of the vehicle $F_{ZV}$ and the payload $F_{ZC}$, may therefore reach or even exceed 600 tonnes.

These site vehicles comprise a front wheelset axle assembly comprising two steered wheels, and a rigid rear wheelset axle assembly generally comprising four twinned driven wheels arranged in pairs on each of the sides of the vehicle. A wheelset is defined as being all of the pneumatic tyre elements providing the ground-contact system between the ground and the bearing chassis of the vehicle. The distance between the front wheelset and the rear wheelset defines the wheelbase E of the vehicle. The total load ($F_{ZTot}$) is distributed between the front wheelset ($F_{ZAV}$) and the rear wheelset $F_{ZAR}$ and then, according to their position, between the six tyres ($F_{ZS\ Pneu}$) that form the running gear, the vehicle being stationary on flat ground. During running, this static load is accompanied by a dynamic load that is variable, which may go so far as to double the instantaneous load borne by a tyre.

The tyres of the vehicle illustrated in FIG. 1 comprise pressure sensors 40, 41 which are connected to a computer processing unit 20. An accelerometer 30, able to measure the longitudinal acceleration $\gamma_l$ experienced by the vehicle, is also connected to the said computer processing unit 20. Data interchange means for exchanging data between the computer processing unit and the pressure and longitudinal-acceleration sensors are also provided.

Alternatively, it is also possible to determine the value of $\gamma_l$ by connecting the vehicle positioning data obtained by a GPS (Global Positioning System) system to the known profile of the route followed by the vehicle, and by assigning to each point on this route a value for the inclination of the gradient encountered by the vehicle. The gradient may also be calculated directly by taking account of altitude variations measured by the GPS system.

The period of running time during which the method is implemented is broken down into several time intervals within which the load borne by the vehicle is constant. As a general rule, these time intervals correspond to the times of the unladen-journey cycles and to the times of the laden-journey cycles during which the total laden weight corresponds to the total unladen weight increased by the weight of the payload. It will be noted that the weight of this payload may vary from one laden-journey cycle to another.

Step a in the implementation of the method according to the invention consists in measuring a value $P_M$ for the air pressure prevailing inside the tyre. This measurement may be taken continuously or at a given frequency. Steps are therefore taken to ensure that this sampling frequency is higher than 10 Hz and preferably higher than 20 Hz so as to be very much higher than the frequency at which the dynamic load varies.

Figure 2:
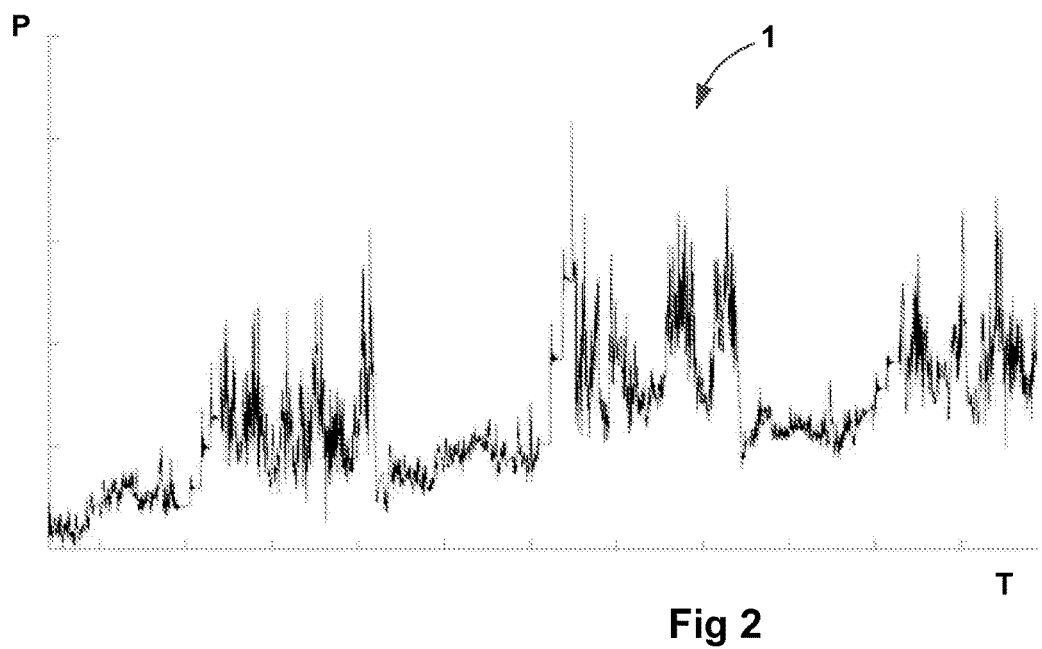
FIG. 2 represents an extract of a recording of the inflation pressure, measured in a tyre as a function of time.

FIG. 2 illustrates a recording 1 of the measured pressure $P_M$ within a front right tyre during a time period comprising several distinct time intervals corresponding to unladen-running cycles and to laden-running cycles.

During step b in the implementation of the method, the value of the difference in load seen by a tyre during the time interval under consideration according to the profile of the route taken by the vehicle during this time interval is calculated for each pressure measurement point.

In order to do this, a value for the total load ($F_{Z\,AV}+F_{Z\,AR}$) borne by the vehicle is predetermined, as too is the value of the height h of the centre of gravity G during this time interval.

The value for the total load can be obtained by weighing the vehicle before and after it is unloaded. When these data are not accessible, a first assumption based on likely observations is made. For an unladen vehicle, the value of the unladen static load ($F_{ZV}$) and the position of the centre of gravity, unladen, are generally contained in the technical information available from the vehicle manufacturer. The estimate of the payload $F_{ZC}$ may usefully be taken from the manufacturer's technical documentation or from statistical observations made previously. The height h of the centre of gravity will vary according to whether the vehicle is running unladen or laden.

In order to improve the predetermination of the total load of the vehicle during a time interval, it is possible, at the end of step a, and as a preliminary to the starting of step b, to identify from the recording of the measured pressure and in the running period under consideration, the various time intervals that correspond to different running cycles and during which the total load of the vehicle and the load borne by the tyre are different. When the vehicle is running unladen, the payload $F_{ZC}$ is equal to zero.

To do this, use may beneficially be made of bandpass filters. The time intervals during which the vehicle is laden correspond to the durations for which the measured pressure values are above a given threshold, and the time intervals during which the vehicle is running unladen correspond to the durations during which the measured pressure values are below this threshold.

Figure 3:
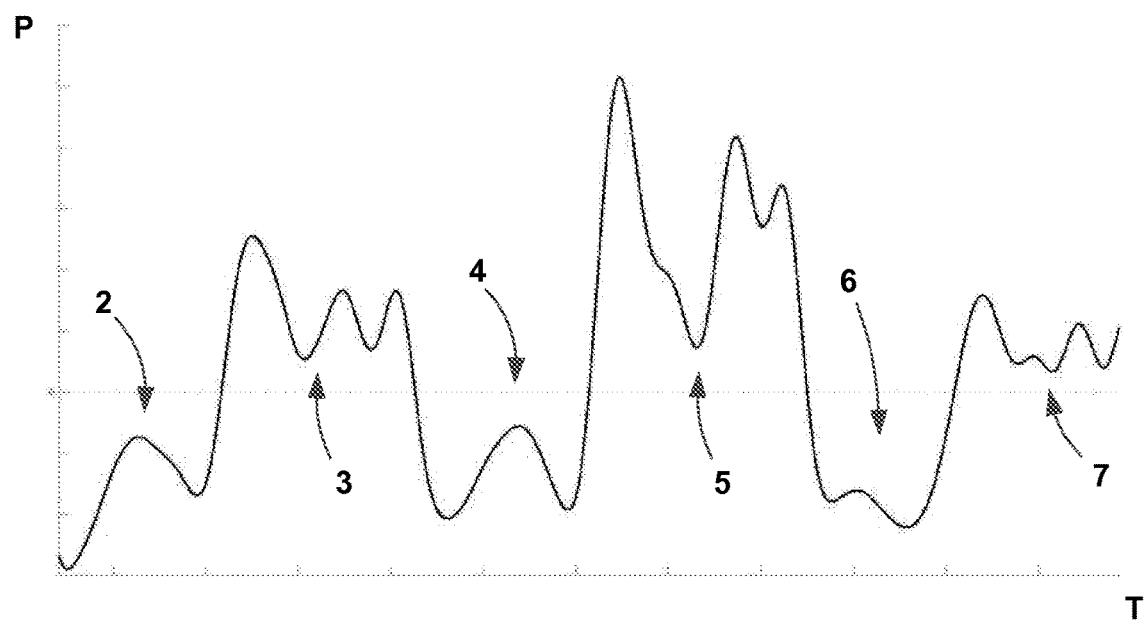
FIG. 3 is a graph illustrating the result of the processing intended to identify the time intervals corresponding to laden or unladen running cycles.

The result of this processing is illustrated in FIG. 3 in which it is possible to distinguish the lower-pressure zones 2, 4, 6, which correspond to unladen-running cycles, and the higher-pressure zones 3, 5, 7, which correspond to laden-running cycles.

The static load borne by a tyre $F_{ZSPneu}$ will therefore be dependent on the position of the centre of gravity, on the position of the tyre on the vehicle, and on the total load $F_{ZTot}$ of the vehicle, which is the sum of the unladen load $F_{ZV}$ and of the payload $F_{ZC}$. This calculation calls upon models of the functional model or multi-body model type, both known to those skilled in the art.

When the vehicle is placed on inclined ground, there is a transfer of load $\Delta F_Z$ between the front and rear axles.

This transfer of load between axles can be calculated simply using a predetermined law of the type:

$$\Delta F_Z = \frac{h}{E} * \frac{(F_{Z\,AV} + F_{Z\,AR})}{g} * \gamma_l \quad (L)$$

Where $\Delta F_Z$ represents the value of the load transfer between axles, where ($F_{Z\,AV}+F_{Z\,AR}$) represents the sum of the load borne by the front axle and of the load borne by the rear axle, this sum being equal to the total static load of the vehicle $F_{Z\,Tot}$, where g represents the value of the acceleration due to gravity, h the height of the centre of gravity during this time interval, and γl the value of the transverse acceleration.

To a first approximation, it is considered that this load transfer is split evenly between the tyres of the front axle and those of the rear axle. So it is considered that each of the tyres of the front wheelset experiences a difference in load $\Delta F_{ZPneu}$, equal to $$\Delta F_{ZPneu}AV = \frac{\Delta F_Z}{2},$$

and that each of the tyres of the rear wheelset experiences a difference in load equal to $$\Delta F_{ZPneu}AR = \frac{\Delta F_Z}{4}.$$

The algebraic value of the difference in load $\Delta F_{ZPneu}$ experienced by a tyre is dependent on the direction of the gradient and on the position of the tyre. Thus, for a tyre arranged on the front wheelset when the vehicle is facing in the direction of ascent, the value of the difference in load decreases the value of the load borne by the said tyre when the vehicle is placed on flat ground. The value of the difference in load $\Delta F_{ZPneu}$ for a tyre arranged on the rear wheelset when the vehicle is facing in the direction of ascent, represents an increase to the load borne by that tyre when the vehicle is placed on flat ground.

On flat ground and at constant speed, the value of $\gamma_l$ is zero, and the transfer of load between axles $\Delta F_Z$ is equal to zero.

For each pressure value measured during the time interval under consideration, the predetermined law L and the instantaneous value of the longitudinal acceleration $\gamma_l$ are used to calculate the value of the difference in load $\Delta F_{ZPneu}$ for the tyre under consideration.

And, using a model of the tyre established beforehand and which connects a difference in load with a variation in pressure with respect to a known initial state, a pressure differential ΔP connected with the difference in load seen by the tyre, is determined.

This model of the tyre, as a general rule, takes the form of a look-up table, of one or more graphs, or else of a mathematical relationship, all of which are specific to a size of tyre moving under controlled conditions. Advantageously, these data are obtained for known rim and tyre temperatures. Likewise, it is preferable for this model to be determined on ground similar to the ground on which the vehicle is intended to operate, in order to account for the potential deformation of the ground liable to influence the variation in pressure inside the tyre, particularly when the ground is loose ground.

The data derived from the model of the tyre are stored in the memory of the computer processing unit 20.

Figure 4:
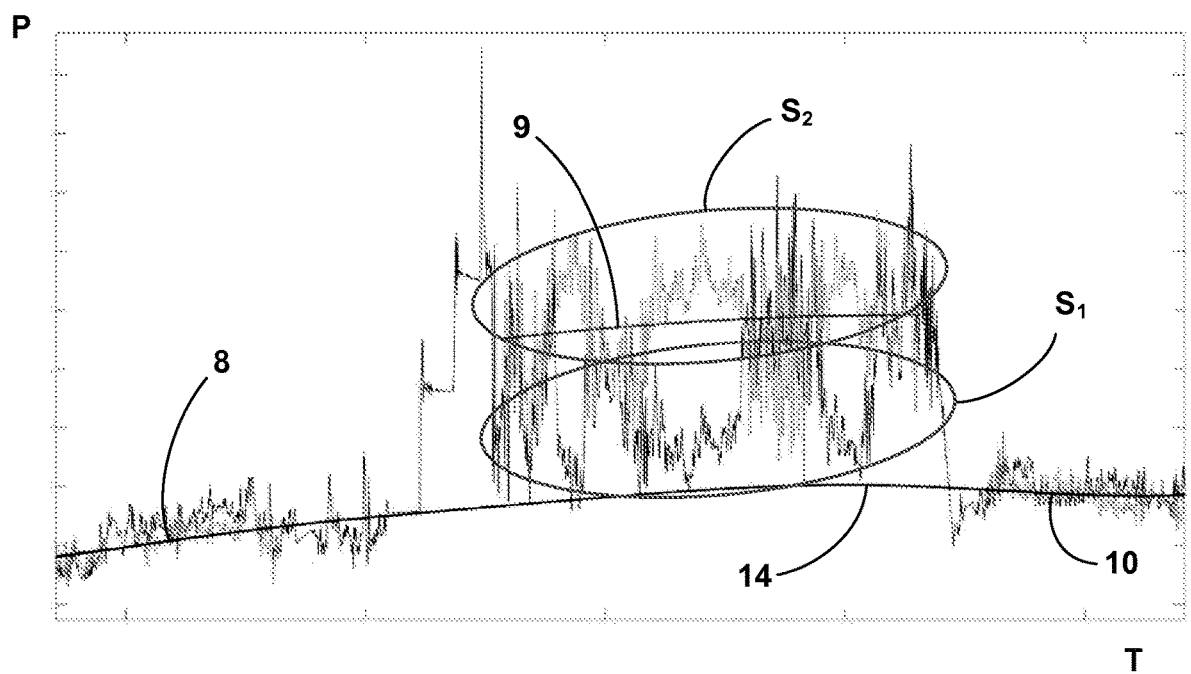
FIG. 4 is a graph illustrating how the corrected pressure and the reference pressure evolve as a function of time for a front right (AD) tyre.

In step c, the measured pressure value $P_M$ is corrected for the pressure differential ΔP determined previously in step b. This correction is illustrated in FIG. 4, in which the measured-pressure values $P_M$ are surrounded by a first ellipse $S_1$, and the corrected pressure values $P_C$ by a second ellipse $S_2$. It may be seen that, for a front right tyre, arranged in its mounted position, the corrected pressure values $P_C$ are higher than the measured pressure values $P_M$.

At the end of step c, pressure values substantially equivalent to those that would have been obtained for the same load and internal-air-temperature conditions, had the vehicle run over flat ground, are obtained for the whole of the running period.

In step d, and in a way similar to that of the method described in publication EP 2 593 317, a reference pressure value $P_R$ is determined for each time interval and at each corrected pressure point $P_C$. This reference pressure $P_R$ corresponds to the pressure that the tyre would have if subjected to the same temperature variations and to a determined constant reference static load $F_{ZSRef}$ for this time interval. It makes it possible to highlight slow changes in pressure associated with the changes in temperature, and get around the high-frequency variations which are associated with the variations in dynamic load.

Without implying any limitation, this static reference load $F_{ZSRef}$ may correspond to the static load borne by the tyre during the time interval under consideration and be equal to the static load $F_{ZSPneu}$ determined in step b, or else to the static load $F_{ZVPneu}$ borne by the tyre when the vehicle is running unladen.

The reference pressure values $P_R$ may be obtained using a lowpass filter to eliminate the variations associated with the dynamic response of the vehicle or, for preference, using a best-fit polynomial $P_R(t)$ that defines the reference pressure values as a function of time within each of the time intervals considered during the course of the running period. In this way, reference-pressure-value segments visible as 8, 9 and 10 in FIG. 4 or as 8, 9, 10, 11, 12 and 13 in FIG. 5, are defined.

It is possible to improve this result by eliminating the pressure values obtained at the start and end of each time period, in order to get around abnormal values associated with the loading and unloading operations.

Figure 5:
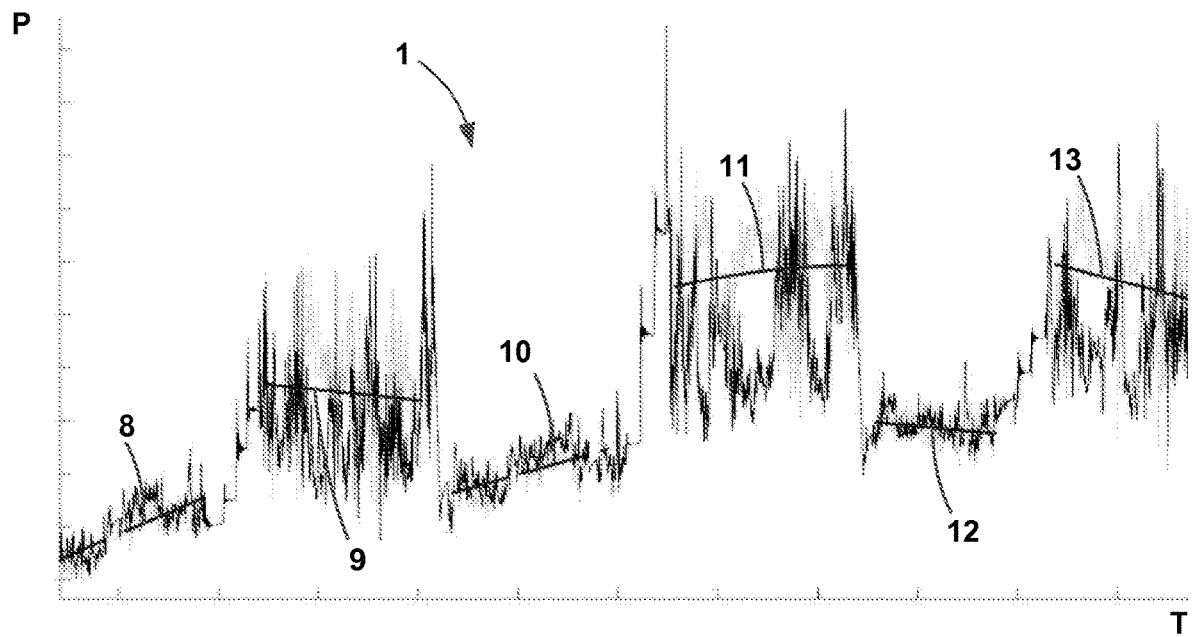
FIG. 5 depicts reference-pressure curves superimposed on the signal from FIG. 2, for each of the time intervals.

When the static reference load $F_{ZSRef}$ corresponds to the load actually borne by the tyre $F_{ZSPneu}$ when the vehicle is running alternately laden or unladen, as is illustrated in FIG. 5, the values given by the best-fit polynomials $P_R(t)$ constitute the reference pressure $P_R$ made up alternatively from segments 8, 10, 12 which corresponds to a time interval during which the vehicle is running unladen, and from segments 9, 11, 13 which corresponds to a time interval during which the vehicle is carrying a payload. These segments are disjointed.

When the static reference load $F_{ZSRef}$ corresponds to the unladen static load $F_{ZVPneu}$, it is necessary to determine the reference pressure values for the time intervals corresponding to laden-running cycles. These reference pressure values represent the unladen reference pressure $P_{RV}$.

In order to perform this processing, a first method involves interpolating or extrapolating the reference pressure values obtained during the time periods immediately prior and subsequent to the said laden-running cycle under consideration and which correspond to unladen-running cycles. This interpolation can be done easily using the best-fit polynomials $P_R(t)$ for these two unladen-running cycles.

A second method involves adjusting, by translation, the pressure values obtained using the best-fit polynomial $P_R(t)$ determined during the time interval corresponding to this laden-running cycle. These values represent the laden reference pressure $P_{RC}$. This translation is performed in such a way that the reference pressure values at the start and end of this time interval more or less align with, respectively, the reference pressure values obtained at the end of the time interval corresponding to the previous unladen-running cycle, and at the start of the time interval corresponding to the next unladen-running cycle. These translated values correspond to the unladen reference pressure $P_{RV}$.

Figure 6:
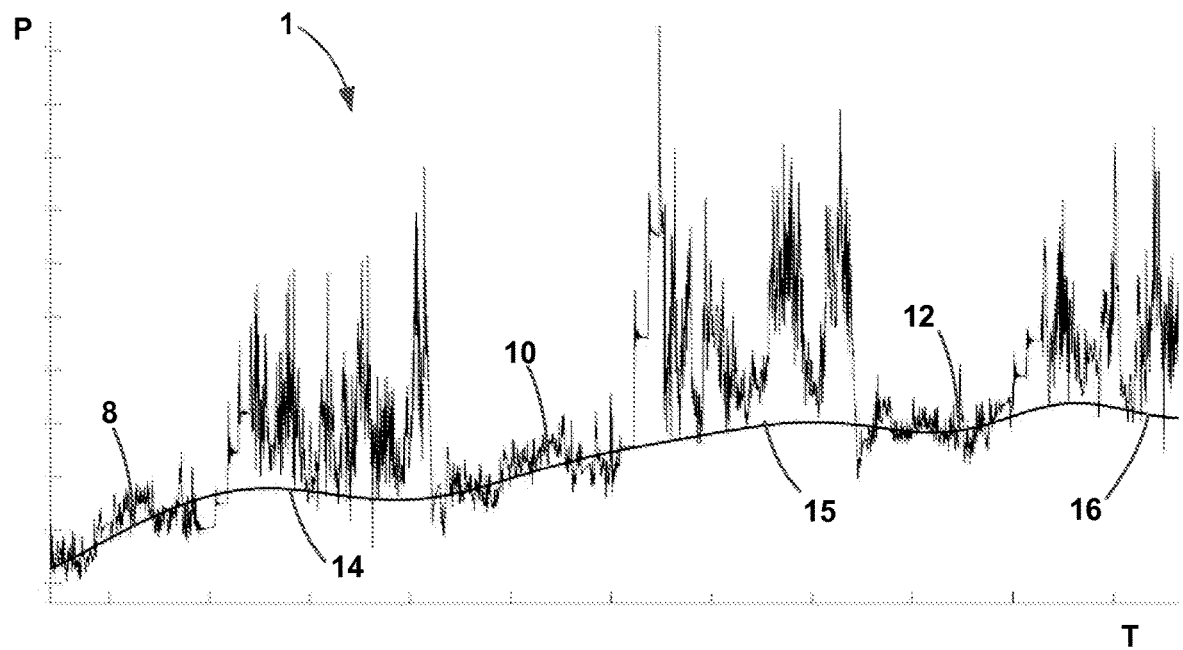
FIG. 6 depicts the reference curve superimposed on the signal from FIG. 3, corresponding to a constant load equal to the static load when the vehicle is unladen.

This adjustment is illustrated in FIG. 4 in which the curve portion 9, which features the reference pressure values during the time interval corresponding to a laden-running cycle, is translated downwards (see curve 14) so that it is connected by its two ends to the curved portions 8 and 10 that feature the reference pressure values obtained during the time intervals corresponding to two, one prior and one subsequent, unladen-running cycles. FIG. 6 illustrates how the unladen reference pressure evolves by causing the curve portions representing the reference pressures 8, 14, 10, 15, 12, and 16 to join up. The curve portion 14 corresponds to the translation of the curve portion 9, the curve portion 15 corresponds to the translation of the curve portion 11, and the curve portion 16 corresponds to the translation of the curve portion 13.

In step e, the difference between the measured pressure $P_M$ and the reference pressure $P_R$ obtained in step d is calculated at each pressure measurement point, and, using the model of the tyre that dictates the correspondence between a pressure difference and difference in load, this is used to deduce the value of the dynamic load $\Delta F_{ZD\ Pneu}$ seen by the tyre at this instant.

Figure 7:
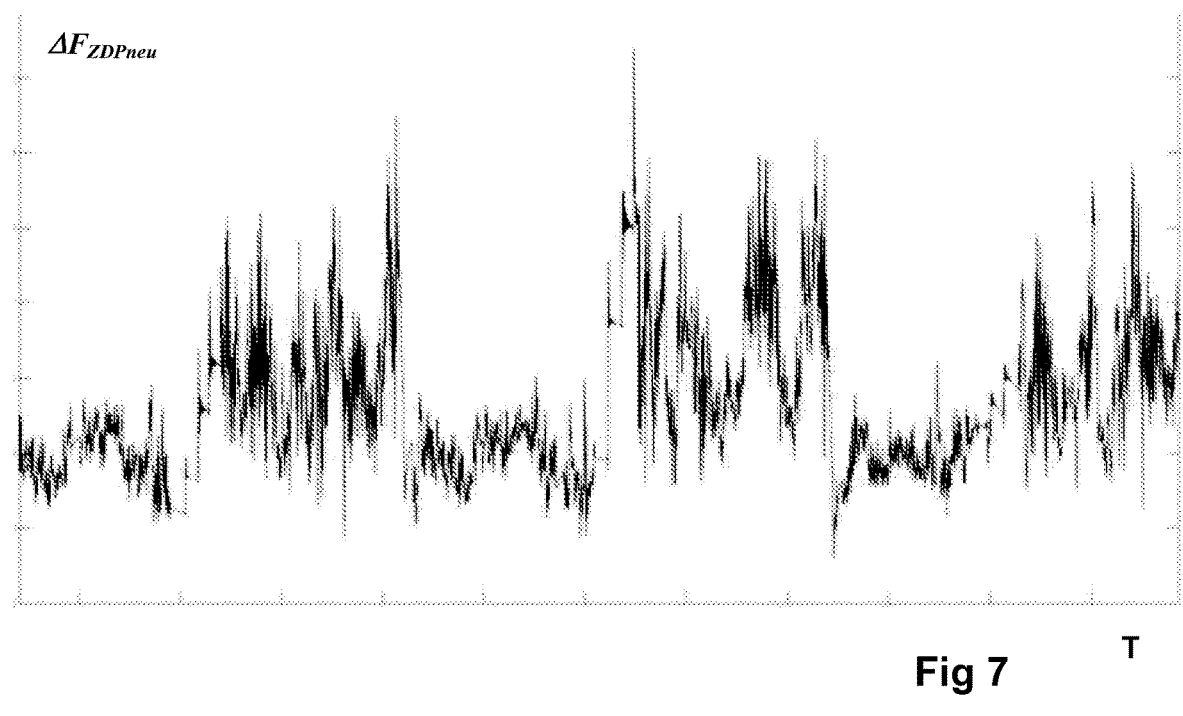
FIG. 7 depicts a curve evaluating the dynamic load borne by a tyre as a function of time for a static reference load equal to the static load borne by the tyre when the vehicle is running unladen.

FIG. 7 shows how the dynamic load $\Delta F_{ZD\ Pneu}$ of the right front tyre varies by considering, by way of static reference load, $F_{ZS\ Ref}$ the load borne by the tyre when the vehicle is running unladen $F_{ZVPneu}$.

The method described hereinabove also makes it possible to estimate the static payload $F_{ZC}$ borne by the vehicle during a given time interval corresponding to a laden-running cycle when this data item is not accessible from a weighing means. This total load corresponds to the sum of the value of the static payloads borne by each of the tyres.

During step f, the value of the payload borne by a tyre during a time interval corresponding to a laden-running cycle is determined using the said model of the tyre and using a difference in pressure between the unladen reference pressure $P_{RV}$ and the laden reference pressure $P_{RC}$, both obtained according to the method described hereinabove.

The sum of the values of the payloads borne by each of the tyres then makes it possible, during a step g, to evaluate the total payload $F_{ZC}$ borne by the vehicle. And, by calculating the sum of this payload and of the total unladen weight of the vehicle $F_{ZV}$, the total laden weight $F_{ZTot}$ of the vehicle during the time interval considered is obtained.

Knowing the payload and the static unladen load borne by each tyre, it is possible easily to determine the load transfer per axle. And, by inverting the predetermined law (L) mentioned hereinabove, it is then possible to calculate the height h of the centre of gravity G for each time interval of the running period.

If the values of the total laden weight of the vehicle $F_{ZTot}$ and of the height h differ significantly from the predetermined values estimated during step b, it is then possible to rerun steps b, c, d, e, f, and g as many times as necessary until these values converge towards stabilized values.

At the end of these calculations, it is then possible to determine the variation in dynamic load $\Delta F_{ZD\ Pneu}$ of the tyre with a good level of accuracy on the basis of the pressure and longitudinal-acceleration values alone.

Because of the high amplitudes observed, it is possible to gain a better understanding of certain phenomena that lead to premature tyre degradation and to implement the corrective solutions by altering the design of the tyres or the conditions in which the vehicle is operated, such as for example track maintenance or route profile.

The invention also relates to the software containing the programmed code elements for implementing the method as described hereinabove,
when the said software is loaded into the computer processing unit 20 and executed by the said computer processing unit, or
when the said software is recorded onto a support that can be read on a computer processing unit.

Terminology

2, 4, 6 Time intervals corresponding to unladen-running cycles.
3, 5, 7 Time intervals corresponding to laden-running cycles.
8, 10, 12 Reference pressure corresponding to unladen-running cycles.
9, 11, 13 Reference pressure corresponding to laden-running cycles.
20 Computer processing unit.
30 Accelerometer.
40, 41 Pressure sensors.
G Centre of gravity.
E Wheelbase between axles.
h Height of the centre of gravity with respect to the ground.
$F_{ZAV}$ Static load borne by the front axle.
$F_{ZAR}$ Static load borne by the rear axle.
$F_{ZV}$ Total static load of the vehicle when unladen.
$F_{ZC}$ Static working load borne by the vehicle.
$F_{ZTot}$ Total static load of the vehicle ($F_{Z\ Tot}=F_{ZAV}+F_{ZAR}=F_{ZV}+F_{ZC}$)
$\Delta F_Z$ Transfer of load between axles.
$F_{ZS\ Pneu}$ Static load borne by a tyre.
$F_{ZcPneu}$ Working load borne by a tyre.
$\Delta F_{ZD\ Pneu}$ Variation in the dynamic load borne by a tyre.
$\Delta F_{ZPneu}$ Difference in load experienced by a tyre associated with the transfer of load between axles.
$F_{ZSRef}$ Static reference load borne by a tyre.
$F_{ZVPneu}$ Unladen static load borne by a tyre.
$\gamma_l$ Longitudinal acceleration.
$\Delta P$ Pressure differential associated with the transfer of load between axles.
$P_M$ Measured pressure.
$P_C$ Corrected pressure.
$P_R$ Reference pressure.
$P_{RV}$ Unladen reference pressure.
$P_{RC}$ Laden reference pressure.
$P_R(t)$ Best-fit polynomial.

The invention claimed is:

1. A method for evaluating variation in the dynamic load $\Delta F_{ZD\ Pneu}$ borne by a tire of a vehicle comprising a front axle and a rear axle, the method comprising, during a running period, the steps of:
   (a) measuring a pressure $P_M$ of air contained inside the tire;
   (b) at each pressure measurement point, determining a difference in load $\Delta F_{ZPneu}$ borne by the tire as a function of transfer $\Delta F_Z$ of a total load of the vehicle $F_{ZTot}$ between axles and of the position of the tire on the vehicle and, using a preestablished tire model that connects a difference in load with a difference in pressure, determining a pressure differential $\Delta P$ associated with the difference in load borne by the tire;
   (c) determining a corrected pressure value $P_C$ by calculating an algebraic sum of the value of the measured pressure $P_M$ and the value of the pressure differential $\Delta P$;
   (d) determining, on the basis of corrected pressure values $P_C$, a reference pressure $P_R$ corresponding to the pressure of the same tire subjected to the same temperature conditions and at a determined static reference load $F_{ZSRef}$ and
   (e) calculating the difference between the measured pressure $P_M$ and the reference pressure $P_R$ and determining the variation in dynamic load $\Delta F_{ZD\ Pneu}$ borne by the tire on the basis of the model of the tire.

2. The method according to claim 1, wherein the value of the transfer $\alpha F_Z$ between axles of the total load $F_{ZTot}$ borne by the vehicle is estimated on the basis of a predetermined law connecting the value of the total load borne by the vehicle, $(F_{Z\ Av}+F_{Z\ AR})=F_{zTot}$, the height h of the center of gravity of the vehicle, the value E of a wheelbase separating the front axle and the rear axle, and the value of the longitudinal acceleration $\gamma_l$.

3. The method according to claim 2, wherein the value of the longitudinal acceleration $\gamma_l$ is estimated by connecting the vehicle position data obtained from a GPS system with a known profile of a route taken by the vehicle or by calculating a gradient by taking into consideration the variations in altitude as measured by the GPS system.

4. The method according to claim 2, wherein the value of the longitudinal acceleration $\gamma_l$ is estimated using an accelerometer mounted on the vehicle.

5. The method according to claim 2, wherein the predetermined law is of the type:

$$\Delta F_Z = \frac{h}{E} * \frac{(F_{Z\,AV} + F_{ZAR})}{g} * \gamma_l.$$

6. The method according to claim 1, wherein the reference pressure $P_R$ is obtained by determining a best-fit polynomial $P_R(t)$ fitted to corrected pressure values $P_C$.

7. The method according to claim 1, wherein the running period comprises at least successively an unladen running cycle and a laden running cycle which respectively delimit an unladen running time interval and a laden running time interval.

8. The method according to claim 7, wherein, at the end of step (a) and prior to the start of step (b), time intervals corresponding to laden and unladen running cycles, during which the total load $F_{ZTot}$ of the vehicle remains constant, are identified.

9. The method according to claim 7, further comprising the step:
(f) evaluating a payload $F_{zc}$ borne by the tire during a time interval corresponding to a laden running cycle using the model of the tire and using a difference in pressure between an unladen reference pressure $P_{RV}$ and a laden reference pressure $P_{RC}$.

10. The method according to claim 9, wherein the values of the unladen reference pressure for a time interval corresponding to a laden running cycle are determined by interpolating or by extrapolating the reference pressure values obtained during the unladen running cycles prior and subsequent to the laden running cycle.

11. The method according to claim 9, wherein the unladen reference pressure values $P_{RV}$ for a time interval corresponding to a laden running cycle are determined by adjusting, by translation, the pressure values obtained using the best-fit polynomial $P_R(t)$ determined during the time interval corresponding to this laden running cycle, so that the reference pressure values at the start and at the end of this time interval more or less align with, respectively, the reference pressure values obtained at the end of the time interval corresponding to the previous unladen running cycle, and the reference pressure values obtained at the start of the time interval correspond to the next unladen running cycle.

12. The method according to claim 9, further comprising the step:
(g) calculating the value of the total laden weight $F_{ZTot}$ of the vehicle by calculating the sum of the payloads $F_{zc}$ borne by each of the tires and the total unladen weight $F_{zv}$ of the vehicle and determining a new evaluation of the height h of the center of gravity.

13. The method according to claim 12, wherein steps (b), (c), (d), (e), (f) and (g) are carried out as many times as necessary using, for the value of the total laden weight $F_{ZTot}$ of the vehicle, the value obtained in step (f), and using, for the height h of the center of gravity, the value obtained in step (g), until the value of the total laden weight and the value of the height of the center of gravity converge toward stable values.

14. A device for implementing the method according to claim 1 comprising:
at least one computer processing unit;
data interchange means for exchanging data between the computer processing unit and sensors capable of acquiring values for pressure $P_M$ and for longitudinal acceleration $\gamma_i$; and
coded instructions stored and loaded into the computer processing unit to cause execution of the steps of the method.

15. A non-transitory computer readable storage medium comprising programmed code elements for implementing the method according to claim 1.

* * * * *